US012775819B2

(12) United States Patent
Montaudon et al.

(10) Patent No.: US 12,775,819 B2
(45) **Date of Patent: *Oct. 27, 2026**

(54) REMOTE POWERED CONTACTLESS CARD

(71) Applicants: STMicroelectronics France, Montrouge (FR); STMicroelectronics (Grenoble 2) SAS, Grenoble (FR)

(72) Inventors: Franck Montaudon, Meylan (FR); Julien Goulier, Grenoble (FR)

(73) Assignees: STMICROELECTRONICS FRANCE, Montrouge (FR); STMICROELECTRONICS (GRENOBLE 2).SAS, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 19/237,453

(22) Filed: Jun. 13, 2025

(65) Prior Publication Data

US 2025/0307592 A1 Oct. 2, 2025

Related U.S. Application Data

(63) Continuation of application No. 18/316,964, filed on May 12, 2023, now Pat. No. 12,361,255.

(30) Foreign Application Priority Data

May 25, 2022 (FR) ...................................... 2205059

(51) Int. Cl.
*G06K 19/077* (2006.01)

(52) U.S. Cl.
CPC .............................. *G06K 19/07773* (2013.01)

(58) Field of Classification Search
CPC ........... G06K 7/10148; G06K 19/0701; G06K 19/0715; G06K 19/0726; G06K 19/07773
USPC ................ 235/492; 340/572.1, 572.4, 572.5
See application file for complete search history.

(56) References Cited

U.S. PATENT DOCUMENTS 5,892,300 A 4/1999 Rydval
12,361,255 B2 * 7/2025 Montaudon ........ G06K 19/0726
2017/0005517 A1 * 1/2017 Goulier ................... H02J 50/10
2023/0223948 A1 * 7/2023 Goulier .............. G06K 7/10237 341/155

* cited by examiner

*Primary Examiner* — Suezu Ellis
(74) *Attorney, Agent, or Firm* — Slater Matsil, LLP

(57) ABSTRACT

In an embodiment an electronic device includes a first electronic circuit having a capacitive element with a variable capacitance, wherein the first electronic circuit is configured to couple the capacitive element to an antenna, to measure, by successive iterations, a first analog signal representative of a variation of an instantaneous electric power received by the antenna or representative of the instantaneous electric power received by the antenna and to modify the capacitance of the capacitive element until an amplitude of the instantaneous electric power received by the antenna is a maximum, wherein the antenna is configured to capture an amplitude-modulated electromagnetic field.

20 Claims, 6 Drawing Sheets

REMOTE POWERED CONTACTLESS CARD

CROSS-REFERENCE TO RELATED APPLICATIONS

This application is a continuation of U.S. application Ser. No. 18/316,964, filed on May 12, 2023, which claims priority to French Patent Application No. 2205059, filed on May 25, 2022, which applications are hereby incorporated by reference herein in their entirety.

TECHNICAL FIELD

The present disclosure generally concerns telepowered contactless cards, that is, cards intended to exchange data with a terminal from which they draw their power supply.

BACKGROUND

The terminal emits a magnetic field which is captured by an antenna of the telepowered contactless card. The power supply of the contactless card is obtained from the signal captured by the antenna. Data may be exchanged between the contactless card and the terminal by modulation of the magnetic field emitted by the terminal.

It is generally desirable for the signal captured by the antenna of the contactless card to have the highest possible amplitude for a given amplitude of the magnetic field emitted by the terminal, particularly to ensure a good operating performance of the contactless card, particularly concerning the quality of the data demodulation by the contactless card. For this purpose, it is generally desired for the contactless card to be "tuned" with the terminal, which signifies that the resonance frequency of the assembly comprising the contactless card and the terminal is close or equal to the frequency of the field emitted by the terminal. This resonance frequency particularly depends on the inductance value, and at the second order on the capacitance, of the antenna of the contactless card.

However, current contactless card manufacturing methods cause a significant inaccuracy on the capacitance of the antennas of the contactless cards, and thus a significant inaccuracy on the resonance frequency of the assembly comprising the contactless card and the terminal. It is thus necessary to take into account this inaccuracy on design of the contactless cards to ensure the proper operation of the contactless card even when the contactless card is not correctly tuned with the terminal.

SUMMARY

Embodiments provide an electronic device for a telepowered contactless card.

An embodiment provides an electronic device intended to be connected to an antenna for capturing an amplitude-modulated electromagnetic field, comprising a first electronic circuit comprising a capacitive element with a variable capacitance and configured to couple said capacitive element to the antenna and to, by successive iterations, measure a first analog signal representative of the variation of the instantaneous electric power received by the antenna or representative of the instantaneous electric power received by the antenna, and modify the capacitance of said capacitive element until the amplitude of the instantaneous electric power received by the antenna is maximum.

An embodiment also provides a method of modifying the resonance frequency of an electronic device intended to be connected to an antenna for capturing an electromagnetic field, the electronic device comprising a capacitive element with a variable capacitance and configured to couple said capacitive element to the antenna, the method comprising the repetition of the following steps by the first electronic circuit: measurement of a first analog signal representative of the variation of the instantaneous electric power received by the antenna or representative of the instantaneous electric power received by the antenna; and modification by successive iterations of the capacitance of said capacitive element until the instantaneous electric power received by the antenna is maximum.

According to an embodiment, the electronic device comprises a second electronic circuit for delivering a second analog signal by rectification and filtering of the voltage across the antenna.

According to an embodiment, the second analog signal is a current and the first analog signal is a current proportional to the second analog signal.

According to an embodiment, the device or the method comprises the delivery, by a fifth circuit, of a third binary signal based on the demodulation of the second analog signal.

According to an embodiment, the first electronic circuit comprises: a sensor configured to measure the first analog signal; an analog-to-digital converter configured to convert the first analog signal into a first digital signal; a third electronic circuit for delivering a second digital signal based on the first digital signal; and a fourth electronic circuit comprising the variable-capacitance capacitive element and configured to modify the capacitance of said capacitive element based on the second digital signal.

According to an embodiment, the fourth electronic circuit comprises a digital-to-analog converter with an array of capacitive elements.

According to an embodiment, the fourth electronic circuit comprises a variable-capacitance capacitor.

According to an embodiment, the third electronic circuit is configured, by successive iterations, to modify the second binary signal and determine the resulting variation of the first binary signal.

An embodiment also provides a contactless read card comprising an antenna and an electronic device such as previously defined.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Further, it is here considered that the terms “insulating” and “conductive” respectively signify “electrically insulating” and “electrically conductive.”

Further, a signal which alternates between a first constant state, for example, a low state, noted “0”, and a second constant state, for example, a high state, noted “1”, is called a “binary signal.” The high and low states of different binary signals of a same electronic circuit may be different. In practice, the binary signals may correspond to voltages or to currents which may not be perfectly constant in the high or low state.

Unless specified otherwise, the expressions “around,” “approximately,” “substantially” and “in the order of” signify within 10%, and preferably within 5%. Unless specified otherwise, ordinal numerals such as “first,” “second,” etc. are only used to distinguish elements from one another. In particular, these adjectives do not limit the described embodiments to a specific order of these elements.

Figure 1:
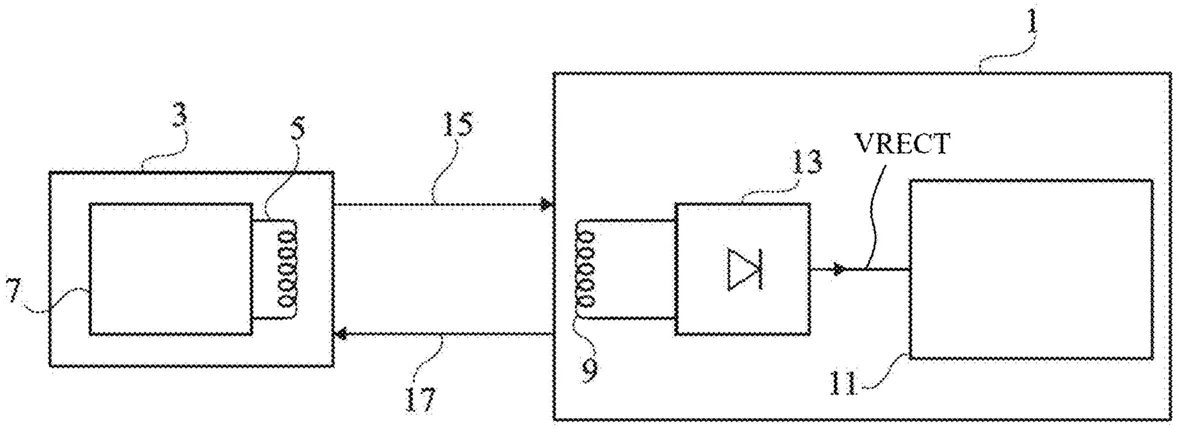
FIG. 1 shows an example of a telepowered contactless card arranged in the vicinity of a terminal.

FIG. 1 shows a telepowered contactless card 1 arranged in the vicinity of a terminal 3. Terminal 3 comprises an antenna 5 and an electronic circuit 7. Contactless card 1 comprises an antenna 9 coupled to a data processing circuit 11 via a shaping circuit 13. Terminal 3 emits an electromagnetic field. Thus, when card 1 is close to terminal 3, it is powered by antenna 9 and is capable of receiving a signal 15 and of transmitting a signal 17.

Terminal 3 for example emits an electromagnetic field at a frequency equal, for example, to 13.56 MHz, called carrier wave hereafter. During a phase of transmission of a signal from terminal 3 to card 1, terminal 3 modulates the carrier wave with a data signal, and the modulated carrier wave is received by the antenna 9 of card 1 and processing circuit 11 recovers the data signal. As an example, the transmission of a signal from terminal 3 to card 1 is performed by amplitude modulation of the carrier wave, particularly by 1-bit amplitude modulation such as defined by standard ISO/IEC 14443. Shaping circuit 13 delivers an analog signal VRECT to processing circuit 11 obtained from the signal captured by antenna 9. Analog signal VRECT is demodulated by processing circuit 11 for the determination of a binary signal. During a phase of transmission of a signal from card 1 to terminal 3, processing circuit 11 may vary the current that it consumes. The current variations in antenna 9 translate as variations of the carrier wave, which are then detected by terminal 3.

Antenna 9 and all the electronic circuits of card 1 form a resonant circuit. It is desirable for the resonance frequency of this resonant circuit to be equal or close to the frequency of the carrier wave, to benefit from the resonance phenomenon, which translates into an amplification the voltage received by processing circuit 11. The resonant circuit of card 1 is then said to be tuned.

Contactless card manufacturing methods, particularly methods of manufacturing antenna 9 and the electronic circuits of card 1, cause a significant distortion of the resonance frequency of cards 1 manufactured according to a same manufacturing method.

Figure 2:
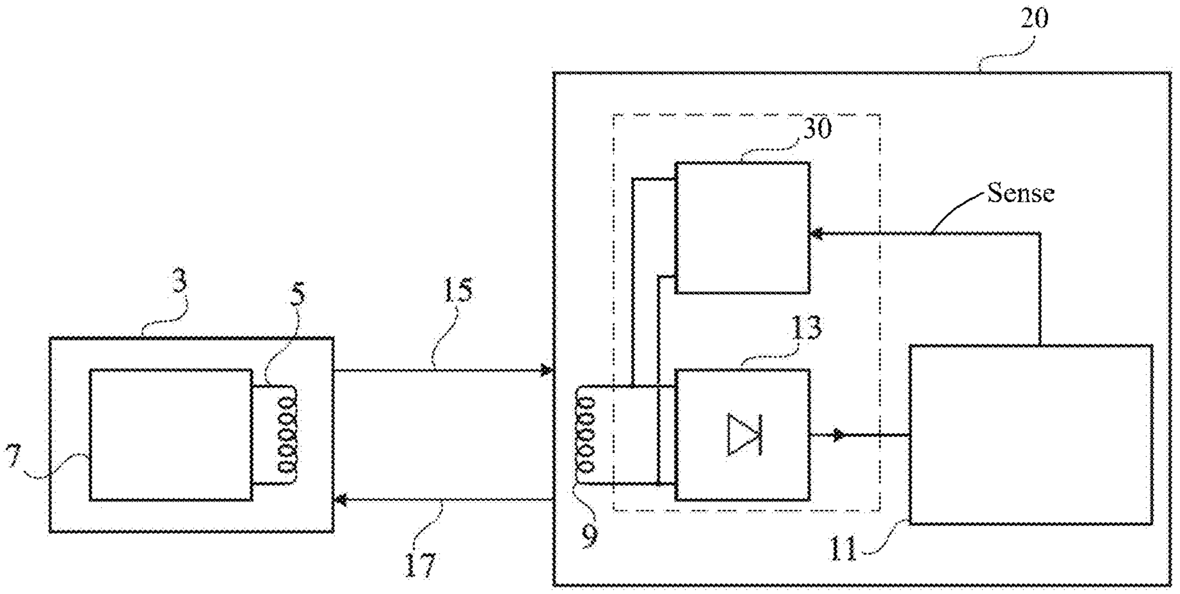
FIG. 2 shows an embodiment of a telepowered contactless card arranged in the vicinity of a terminal.

FIG. 2 is a drawing similar to FIG. 1 and shows an embodiment of a telepowered contactless card 20 arranged in the vicinity of a terminal 3.

Card 20 comprises all the elements of the card 1 of FIG. 1, with the difference that it further comprises a circuit 30 for matching the resonance frequency of card 20 receiving a signal Sense originating from processing circuit 11, and comprising two output terminals coupled to the terminals of antenna 9.

Figure 3:
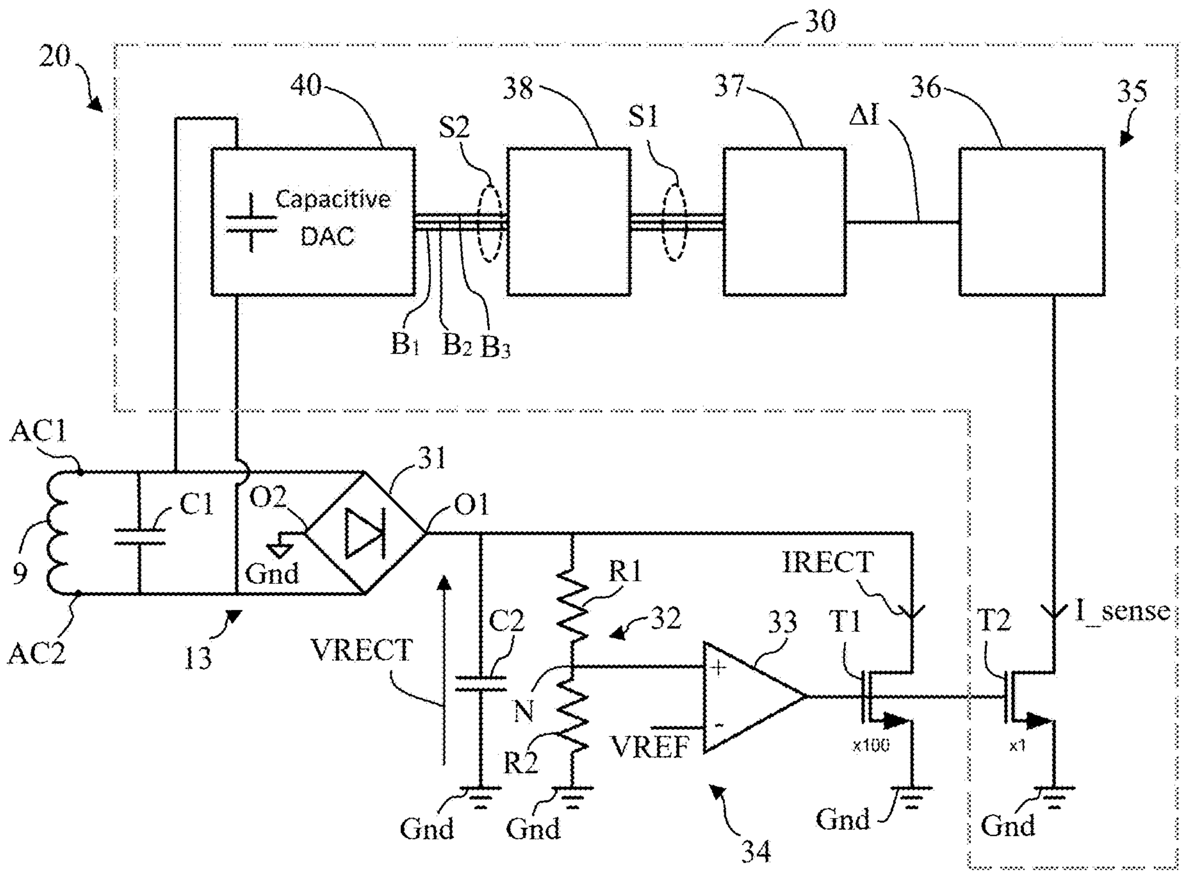
FIG. 3 shows a more detailed embodiment of the contactless card of FIG. 2.

FIG. 3 shows an electric diagram of antenna 9, of an embodiment of shaping circuit 13 and of an embodiment of circuit 30 for matching the resonance frequency of card 20.

According to an embodiment, shaping circuit 13 comprises a capacitor C1 coupled in parallel with the terminals AC2 and AC1 of antenna 9; a rectifying bridge 31, for example, a diode bridge, comprising two inputs coupled, preferably connected, respectively to terminals AC2 and AC1, a first output O1 delivering a rectified signal VRECT, which in the present embodiment corresponds to a rectified voltage, and a second output O2 coupled to a source of a low reference potential Gnd, for example, the ground of card 20; a capacitor C2 having a first plate coupled, preferably connected, to the first output O1 of rectifying bridge 31 and a second plate coupled, preferably connected, to the source of low reference potential Gnd; a voltage dividing bridge 32 for example comprising two resistors R1 and R2 in series between the first output O1 of rectifying bridge 31 and the source of low reference potential Gnd; an insulated-gate field effect transistor T1, also called MOS transistor (Metal Oxide Semiconductor), for example, with an N channel, having its drain coupled, preferably connected, to the first output O1 of rectifying bridge 31 and having its source coupled, preferably connected, to the source of low reference potential Gnd; and a difference amplifier 33 comprising a first input (+) coupled, preferably connected, to a node N between resistors R1 and R2, a second input (−) receiving a reference voltage VREF, and an output coupled, preferably connected, to the gate of transistor T1.

The assembly comprising voltage dividing bridge 32, amplifier 33, and MOS transistor T1 forms a circuit 34 for controlling the impedance seen by antenna 9. Such a circuit 34 for controlling the impedance seen by antenna 9 having the structure shown in FIG. 3 corresponds to an atenna impedance manager circuit placed after rectifying bridge 31. However, the circuit 34 for controlling the impedance seen by antenna 9 may have a structure different from that shown in FIG. 3. It may be an antenna impedance manager placed before rectifying bridge 31.

According to an embodiment, resonance frequency matching circuit 30 comprises: a measurement circuit 35 delivering a first digital signal S1 representative of the variation of the electric power received by antenna 9; a processing circuit 38 receiving first digital signal S1 and delivering a second digital signal S2, for example, in the form of binary signals $B_i$, i being an integer varying from 1 to N, N being an integer greater than or equal to 1, for example varying from 1 to 20, and equal to 3 as an example in FIG. 3; and a digital-to-analog converter (capacitive DAC) 40 with a capacitor receiving second digital signal S2 and comprising two output terminals coupled, preferably connected, respectively to the terminals AC1 and AC2 of antenna 9 in the embodiment illustrated in FIG. 3.

In the embodiment illustrated in FIG. 3, measurement circuit 35 comprises: a MOS transistor T2, for example, with an N channel, having its gate coupled, preferably connected, to the gate of transistor T1, having its source coupled, preferably connected, to the source of low reference potential Gnd, and having its drain receiving a current I_sense; a sensor 36 delivering an analog signal ΔI representative of the variation of the intensity of current I_sense, comprising an input coupled, preferably connected, to the drain of transistor T2; and a circuit 37, for example, an analog-to-digital converter, receiving analog signal ΔI and delivering a digital signal S1 corresponding to the analog-to-digital conversion of the variation ΔI of the intensity of current I_sense.

Circuit 37 for delivering digital signal S1, circuit 38 for delivering digital signal S2, and analog-to-digital converter 40 may be rated by a clock signal, not shown. Circuit 37 for delivering digital signal S1 and circuit 38 for delivering digital signal S2 may be rated by clock signals of different frequencies. As an example, circuit 37 may deliver new values of digital signal S1 at a first frequency and circuit 38 may deliver new values of digital signal S2 at a second frequency lower than the first frequency.

According to an embodiment, digital-to-analog converter 40 is a digital-to-analog converter with an array of capacitors, particularly a converter with a unary array, a converter with a binary array, or a C-2C array. As an example, digital-to-analog converter 40 delivers a low capacitance value, preferably a zero capacitance value, when the digital signal received as an input is at "0."

FIGS. 4 to 7 show embodiments of the digital-to-analog converter 40 of the type comprising a capacitor array. Each of these digital-to-analog converters 40 comprises capacitors and switches $SW_i$, each switch $SW_i$ being controlled by binary signal $B_i$, i varying from 1 to N. Each of these digital-to-analog converters 40 further comprises two output terminals OUT1 and OUT2, the capacitance value delivered by converter 40 being applied between each output terminal OUT1 and OUT2 and the source of low reference potential Gnd or directly between the two output terminals. According to an embodiment, terminal OUT1 may be coupled, preferably connected, to terminal AC2 of antenna 9 and terminal OUT2 may be coupled, preferably connected, to terminal AC1 of antenna 9.

Figure 4:
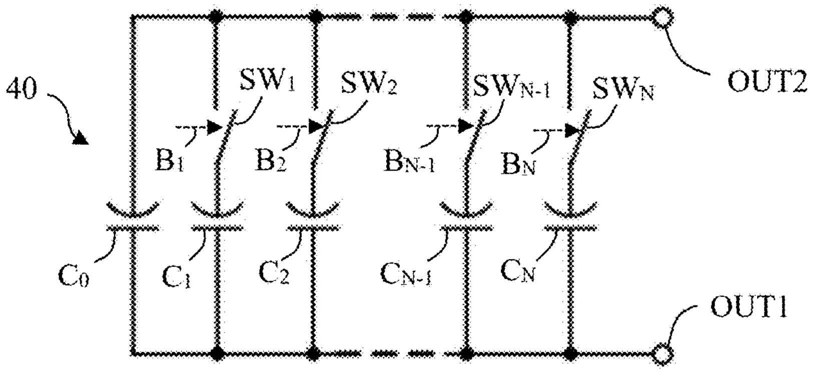
FIG. 4 shows an embodiment of a digital-to-analog converter comprising a capacitor of the contactless card of FIG. 3.

In FIG. 4, digital-to-analog converter 40 is of binary network type. This means that it uses capacitors having capacitances of different values. It for example comprises N+1 branches between terminal OUT1 or OUT2, a branch containing a capacitor $C_0$ and each other branch containing a capacitor $C_i$ in series with switch $SW_i$. Each capacitor $C_i$, i varying from o to N, may have a capacitance equal to $2^i$*C.

Figure 5:
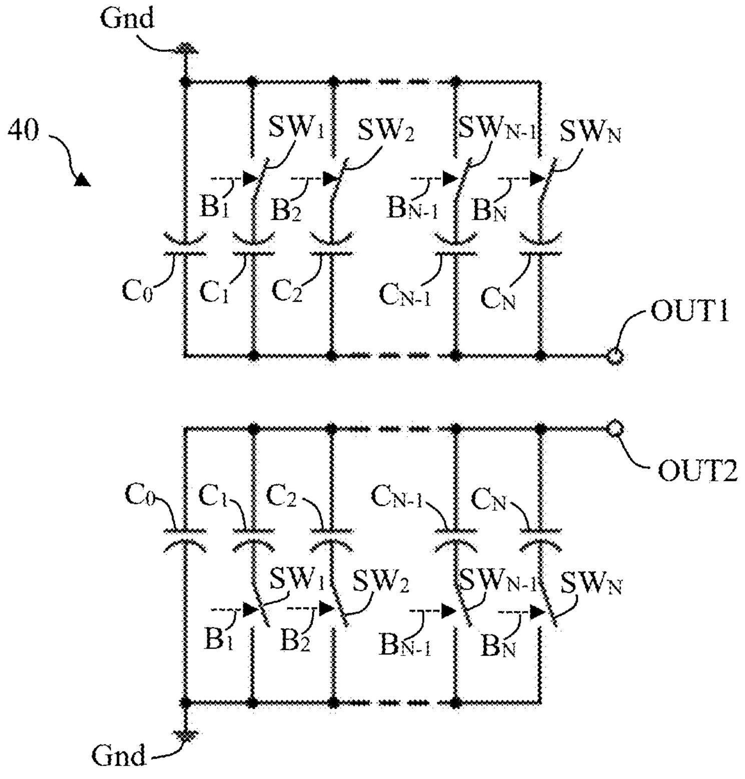
FIG. 5 shows another embodiment of the digital-to-analog converter comprising a capacitor of the contactless card of FIG. 3.

In FIG. 5, digital-to-analog converter 40 is of binary array type. It for example comprises, for each terminal OUT1 and OUT2, N+1 branches between terminal OUT1 or OUT2 and the source of low reference potential Gnd, a branch containing a capacitor $C_0$ and each other branch containing a capacitor $C_i$ in series with switch $SW_i$. Each capacitor $C_i$, i varying from o to N, may have a capacitance equal to $2^i$*C.

Figure 6:
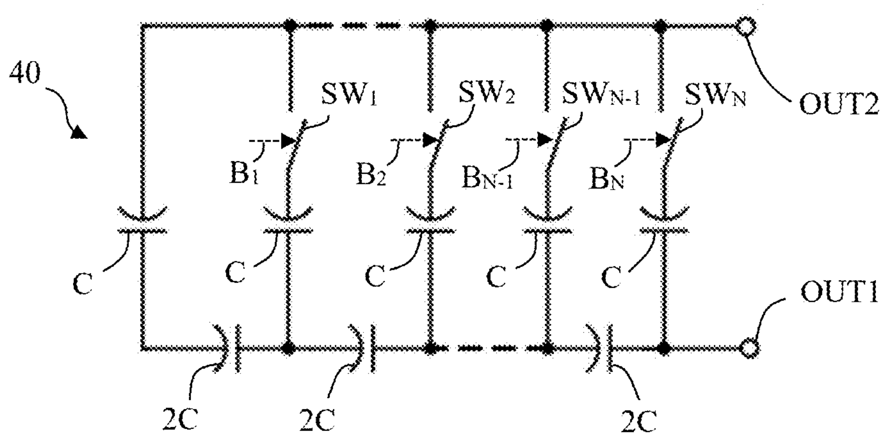
FIG. 6 shows another embodiment of the digital-to-analog converter comprising a capacitor of the contactless card of FIG. 3.
Figure 7:
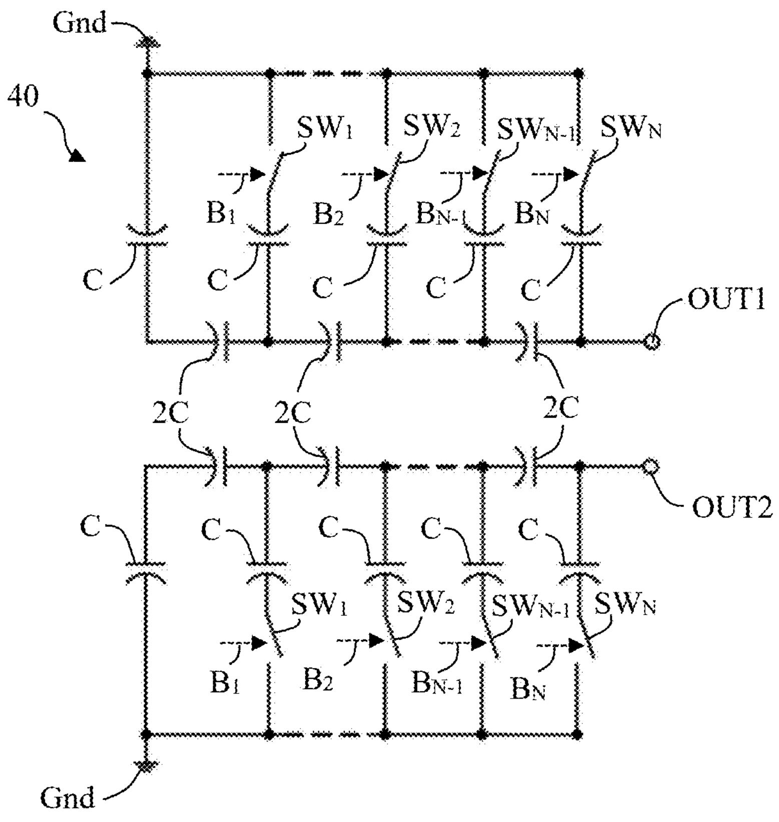
FIG. 7 shows another embodiment of the digital-to-analog converter comprising a capacitor of the contactless card of FIG. 3.

In FIGS. 6 and 7, digital-to-analog converter 40 is of ladder array type. This means that the capacitor array forms a ladder with a small number of elementary capacitance values. In particular, the array may be of C-2C type with two elementary capacitance values C and 2C. In FIG. 6, the ladder array is arranged between terminals OUT1 and OUT2, while, in FIG. 7, a ladder array is arranged between each terminal OUT1 and OUT2 and the source of low reference potential Gnd.

Figure 8:
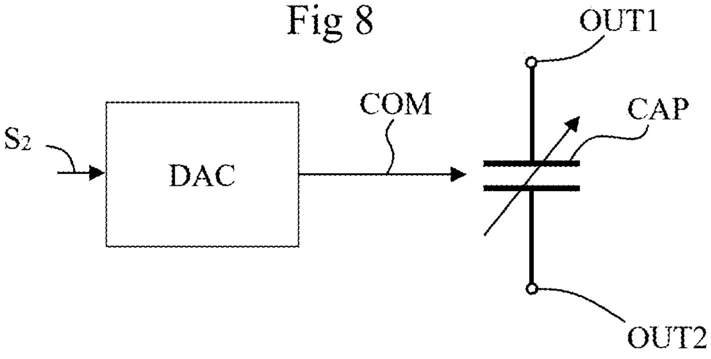
FIG. 8 shows another embodiment of the digital-to-analog converter comprising a capacitor of the contactless card of FIG. 3.

FIG. 8 shows an embodiment of a digital-to-analog converter 40 with a capacitor comprising a variable-capacitance capacitor CAP having its plates coupled, preferably connected, respectively to terminals OUT1 and OUT2 and a digital-to-analog voltage converter 41 receiving digital signal S2 and delivering an analog voltage COM for controlling the capacitance of capacitor CAP, voltage COM corresponding to the digital-to-analog conversion of digital signal S2.

The operation of the shaping circuit 13 shown in FIG. 3 is the following. The voltage across antenna 9 is rectified by rectifying bridge 31 and filtered by capacitor C2. Amplifier 33 delivers to transistor T1 a gate voltage proportional to the difference between the voltage at node N, proportional to voltage VRECT, and reference voltage VREF.Transistor T1, conducting a current IRECT, is thus more or less conductive according to the difference between the voltage at node N, and reference voltage VREF.

Figure 9:
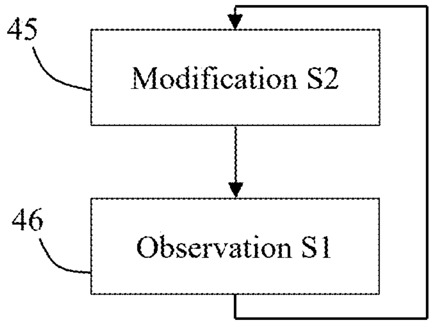
FIG. 9 shows a block diagram of an embodiment of a method of adjustment of the resonance frequency implemented by the contactless card of FIG. 3.

FIG. 9 is a block diagram of an embodiment of a method of operation of circuit 30 for adapting the resonance frequency shown in FIG. 3. The operation of circuit 30 is based on the principle that a variation of the capacitance applied between the terminals AC1 and AC2 of antenna 9 and thus of the properties of the resonant circuit of card 20 causes an increase or a decrease of the average intensity of current I_sense. This increase or decrease is measured by sensor 36. When the current increase becomes, little by little, null, the average intensity of current I_sense then reaches a maximum, contactless card 20 then being tuned.

According to an embodiment, processing circuit 38 modifies at a step 45 digital signal S2, which causes a variation of the capacitance applied between terminals AC1 and AC2 of antenna 9, and determines, at a step 46, in which manner digital signal S1, representative of the variation of the intensity of current I_sense, varies after the modification of digital signal S2. Successive steps 45 and 46 are repeated, circuit 38 applying at step 45 an algorithm of variation of digital signal S2 particularly taking into account the variation of digital signal S1 determined at step 46, until a criterion is fulfilled, for example, until the variation of the average intensity of current I_sense reaches a zero value, which means that a maximum is then reached.

Different algorithms of modification of digital signal S2 may be implemented by circuit 38. According to an embodiment, circuit 38 applies an increment of same sign to digital signal 32 at each step 46 as long as the resulting variation of digital signal S1 determined at step 45 corresponds to an increase of the average of current I_sense. According to an embodiment, circuit 38 can determine the derivative of the instantaneous electric power received by antenna 9 with respect to the voltage across the antenna and vary digital signal S2 until this derivative is equal to zero.

The frequency at which the method implemented by circuit 30 for matching the resonance frequency is executed may depend on the envisaged application. According to an embodiment, the method implemented by circuit 30 for matching the resonance frequency is executed only once during the process of data exchange between contactless card 20 and terminal 3, for example, at the beginning of the process, or a plurality of times during the same process of data exchange between contactless card 20 and terminal 3.

In the embodiment illustrated in FIG. 9, the physical parameter measured by measurement circuit 35 is current I_sense, which is substantially proportional to the current IRECT flowing through transistor T1. The current IRECT flowing through transistor T1 depends on the voltage VRECT between the drain and the source of transistor T1, this voltage VRECT corresponding to the voltage across antenna 9 which has been rectified and filtered. Hence, the variations of current I_sense are representative of variations of the resonance frequency of card 20 if it is considered that the amplitude of the electromagnetic field captured by antenna 9 does not substantially vary during the execution of the method of matching of the resonance frequency by circuit 30. It should however be clear that another physical parameter than current I_sense may be used, particularly according to the structure of shaping circuit 13. According to an embodiment, the measured physical parameter is the rectified and filtered voltage VRECT, a voltage proportional to voltage VRECT, the current flowing through antenna 9, a current proportional to the current flowing through antenna 9, the voltage across antenna 9, or a voltage proportional to the voltage across antenna 9.

Figure 10:
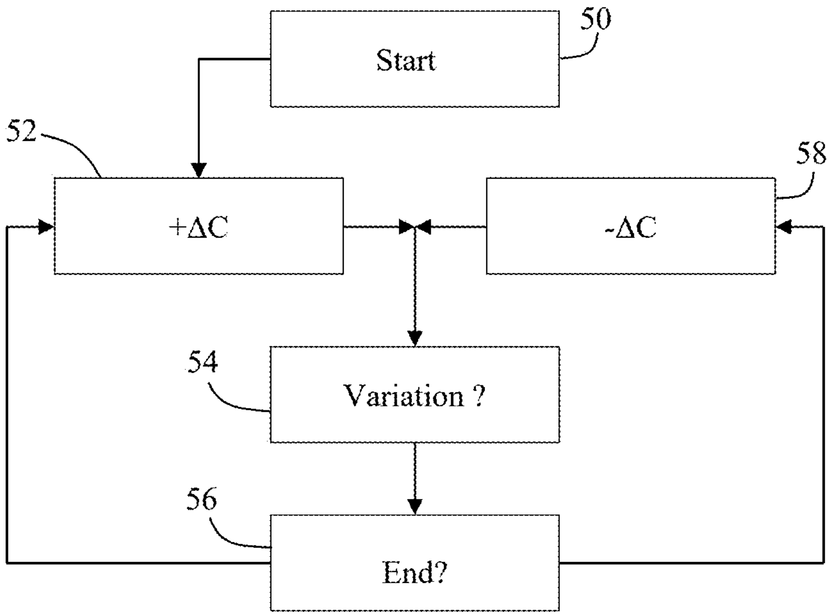
FIG. 10 shows a block diagram of a more detailed embodiment of the method of FIG. 9.

FIG. 10 is a block diagram illustrating a more detailed embodiment of the method implemented by processing circuit 38.

At step 50, processing circuit 38 is controlled to start an operation of matching of the resonance frequency of card 20. The method carries on at a step 52.

At step 52, processing circuit 38 commands a variation of digital signal S2 which causes a variation of the capacitance applied between terminals AC1 and AC2 of antenna 9. As an example, in FIG. 10, step 52 results in an increase (+ΔC) of the capacitance applied between terminals AC1 and AC2. This causes a variation of current I_sense. The method carries on at step 54.

At step 54, processing circuit 38 analyzes signal S1 to know whether the variation of current I_sense is positive or negative, and delivers according to the result a new signal S2. An algorithm is used to thereby detect a maximum. The method carries on at step 56.

At step 56, processing circuit 38 determines whether the matching operation has ended. If processing circuit 38 determines that the matching operation has not ended, the method carries out at step 52 when a current increase has been determined at step 54, or carries on at a step 58 when a current decrease has been determined at step 54.

At step 58, processing circuit commands a variation of digital signal S2 which causes a decrease (−ΔC) of the capacitance applied between terminals AC1 and AC2. The method carries on at step 54.

Steps 52, 58, 54, and 56 are repeated until, at step 56, processing circuit 38 determines that the matching operation has ended. According to an embodiment, at each step 52 and 58, the same positive or negative shift is applied to digital signal S2, causing a same variation, positive or negative, of the capacitance applied by circuit 40 between the terminals AC1 and AC2 of antenna 9. According to another embodiment, at each stage 52 and 58, the shift, positive or negative, applied to digital signal S2 may depend on the last measured variation of digital signal S1 or on last measured variations of digital signal S1.

At step 56, according to an embodiment, the matching operation may be interrupted for example when a decrease of the average intensity of current I_sense is determined after an increase of the average intensity of current I_sense has been determined, which means that the average intensity of current I_sense has transited through a maximum. Processing circuit 38 can thus control digital signal S2 to the value for which the measured average intensity of current I_sense is maximum. As a variant, it may be desirable for processing circuit 38 to control digital signal S2 to a value different from the value for which the measured average intensity of current I_sense is maximum. Indeed, it may be desirable for the resonance frequency of card 20 to be slightly different from the frequency of the electromagnetic field emitted by terminal 10. As an example, processing circuit 38 can then control digital signal S2 to a value shifted by a given shift with respect to the value for which the measured average intensity of current I_sense is maximum.

At step 56, according to another embodiment, the adaptation operation may be interrupted for example after a given number of repetitions of steps 52, 58, 54, and 56 during which an increase of the average intensity of current I_sense is always detected.

First simulations have been performed. For the first simulations, processing circuit 11 and resonance frequency matching circuit 30 have the structures shown in FIGS. 3 and 4 and the method implemented by processing circuit 38 corresponds to the method illustrated in FIG. 10.

Figure 11:
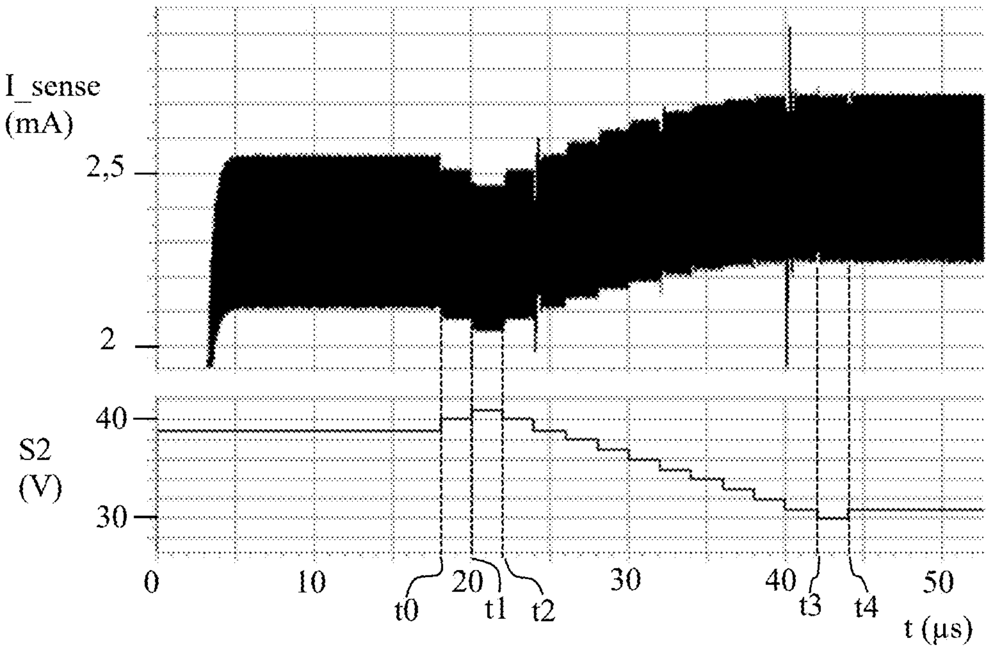
FIG. 11 shows timing diagrams, obtained by simulation, of an analog signal obtained from the electromagnetic field captured by the antenna of a contactless card and of a binary signal used during the implementation of the embodiment of the method of adjustment of the resonance frequency illustrated in FIG. 10.

FIG. 11 shows, over time, a curve of variation of current I_sense in the top portion of FIG. 11 and a curve of variation of digital signal S2 after the digital-to-analog converter in the bottom portion of FIG. 11. Times t0, t1, t2, t3, and t4 are successive times.

An operation of matching of the resonance frequency starts at time t0. Circuit 30 for matching the resonance frequency commands an increase by one unit of signal S2, which causes an increase of the capacitance applied between terminals AC1 and AC2 by a capacitance increment. Circuit 30 determines whether intensity I_sense has increased or decreased. At time t1, resonance frequency matching circuit 30 commands a new increase by one unit of signal S2, which causes an increase of the capacitance applied between terminals AC1 and AC2 by a capacitance increment. Circuit 30 compares the average intensity of current I_sense after time t1 with the average intensity of current I_sense before time t1 and determines that the average intensity of current I_sense has decreased.

At time t2, circuit 30 commands a decrease by one unit of signal S2, which causes a decrease of the capacitance applied between terminals AC1 and AC2 by a capacitance increment. Circuit 30 compares the average intensity of current I_sense after time t2 with the average intensity of current I_sense before time t2 and determines that the average intensity of current I_sense has increased.

Circuit 30 then commands, during ten successive iterations, a decrease by one unit of signal S2, which causes, each time, a decrease of the capacitance applied between terminals AC1 and AC2 by a capacitance increment. At the nine first iterations, an increase of the average intensity of current I_sense is determined by circuit 30, this increase being however lower and lower, and at the tenth iteration, a slight decrease of the average intensity of current I_sense is determined by circuit 30 after time t3. Circuit 30 thus determines that the average intensity of current I_sense has transited through a maximum. The matching operation is then ended after, at time t4, circuit 30 has commanded an increase of signal S2 by one unit.

Second simulations have been performed. For the second simulations, processing circuits 11 and resonance frequency matching circuits 30 have the structure shown in FIGS. 3 and 4 and only differ by the structure of antenna 9. The method implemented by processing circuit 38 corresponds to the method illustrated in FIG. 10.

Figure 12:
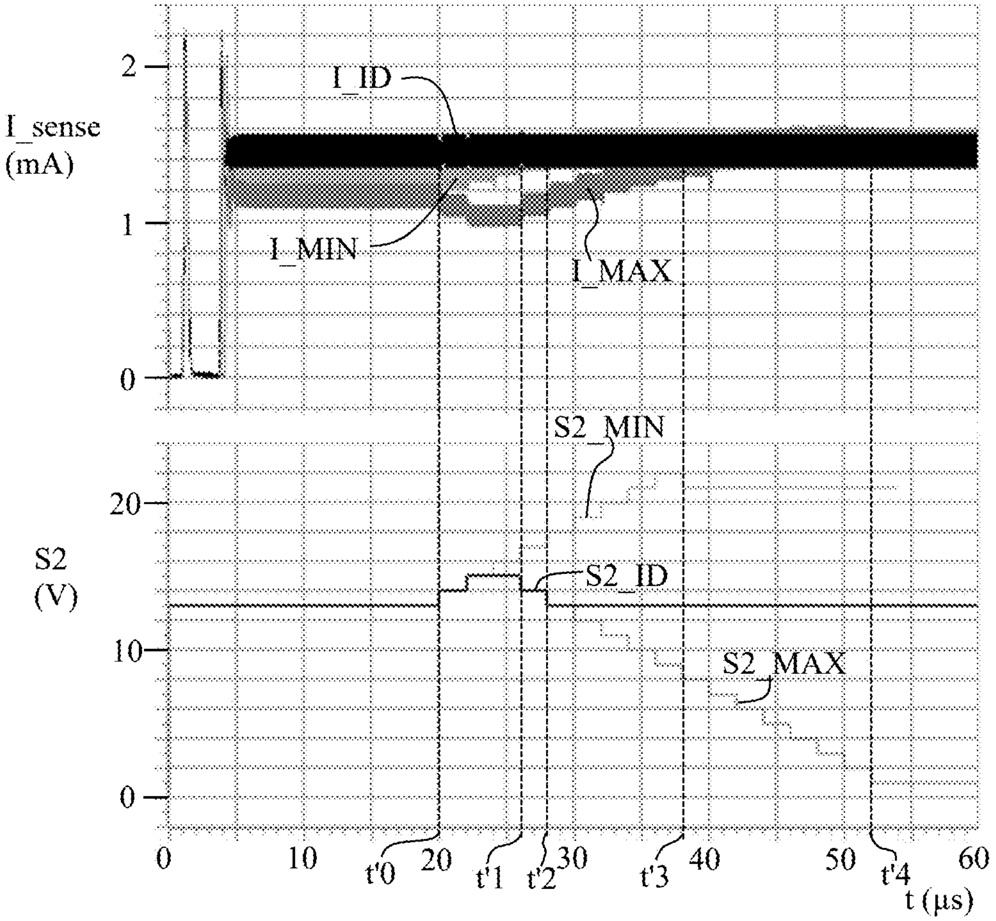
FIG. 12 shows timing diagrams, similar to those of FIG. 11, for three contactless cards having antennas having different inductances.

FIG. 12 shows, over time: a curve of variation of the intensity I_ID of current I_sense for a configuration of antenna 9 which enables to obtain an initial resonance frequency for card 20 adapted to the frequency of the carrier wave; a curve of variation of the intensity I_MAX of current I_sense for a configuration of antenna 9 resulting in a maximum initial resonance frequency for card 20; a curve of variation of the intensity I_MIN of current I_sense for a configuration of antenna 9 resulting in a minimum initial resonance frequency for card 20; a curve of variation S2_ID of digital signal S2, after the digital-to-analog conversion, corresponding to the measured intensity I_ID; a curve of variation S2_MAX of digital signal S2, after the digital-to-analog conversion, corresponding to the measured intensity I_MAX; and a curve of variation S2_MIN of digital signal S2, after the digital-to-analog conversion, corresponding to the measured intensity I_MIN.

Times t'0, t'1, t'2, t'3, and t'4 are successive times. The resonance frequency matching method starts for each second simulation at time t'0. For the configuration of antenna 9 resulting in an initial resonance frequency for card 20 matched with the frequency of the carried wave, circuit 30 commands at time t'0 an increase of digital signal S2_ID, then at time t'1 a decrease of digital signal S2_ID, to eventually hold after time t'2 digital signal S2_ID at the value that it had before time t'0. Since card 20 is already tuned with terminal 3, the average intensity of current I_ID after time t'2 is substantially the same as at time t'0.

For the configuration of antenna 9 corresponding to measured intensity I_MIN, the average intensity of current I_MIN just before time t'o is lower than the average intensity of current I_ID just before time t'0. Circuit 30 commands at time t'0 an increase of digital signal S2_ID, which carries on for nine successive iterations until time t'3 at which circuit 30 commands a decrease of digital signal S2_MIN, and then holds digital signal S2_MIN at a constant level. The curve of variation of current I_MIN then substantially coincides with the curve of variation of current I_ID.

For the configuration of antenna 9 corresponding to the measured intensity I_MAX, the average intensity of current I_MAX just before time t'0 is lower than the average intensity of current I_ID just before time t'0. Circuit 30 commands at time t'0 an increase of digital signal S2_MAX, then at time t'1 a decrease of digital signal S2_MAX which carries on for fourteen successive iterations until time t'4 after which circuit 30 holds digital signal S2_MIN at a constant level. The curve of variation of current I_MAX then substantially coincides with the curve of variation of current I_ID.

Various embodiments and variants have been described. Those skilled in the art will understand that certain features of these various embodiments and variants may be combined, and other variants will occur to those skilled in the art. In the previously-described embodiment, the digital signal S1 delivered by circuit 37 is representative of the variation ΔI of the intensity of current I_sense. As a variant, the sensor may be configured to directly measure the intensity of current I_sense and circuit 37 may be configured to deliver digital signal S1 representative of the intensity of current I_sense. In this case, the modification by successive iterations of the capacitance of said capacitive element is performed until digital signal S1 is maximum.

Finally, the practical implementation of the embodiments and variants described herein is within the capabilities of those skilled in the art based on the functional indications provided hereinabove.

What is claimed is:

1. A method for optimizing power reception in a contactless device, the method comprising:

capturing, by an antenna, an amplitude-modulated electromagnetic field at a carrier frequency;

converting, by a rectifying circuit coupled to the antenna, the amplitude-modulated electromagnetic field into a rectified signal;

converting, by a measurement circuit, an analog signal representative of electric power received by the antenna from the rectified signal into a digital signal;

determining, by a controller, through successive iterations, whether changes to a capacitance of an array of selectively couplable capacitors coupled to the antenna result in an increase or decrease of the electric power received by the antenna by monitoring the digital signal;

selectively coupling or decoupling, by the controller, capacitors in the array of selectively couplable capacitors to set a total capacitance that maximizes the electric power received by the antenna; and maintaining, by the controller, the total capacitance at the value that maximizes the electric power received after the successive iterations are complete.

2. The method of claim 1, wherein the rectifying circuit comprises a diode bridge having two inputs coupled to terminals of the antenna and a first output delivering the rectified signal as a rectified voltage.

3. The method of claim 2, further comprising:

filtering the rectified signal using a capacitor coupled between the first output of the diode bridge and a ground reference; and controlling an impedance seen by the antenna using a voltage dividing bridge and a difference amplifier coupled to a MOS transistor.

4. The method of claim 1, wherein the measurement circuit comprises:

a sensor configured to deliver the analog signal as a current signal representative of a variation of intensity of a sense current; and an analog-to-digital converter configured to convert the analog signal into the digital signal.

5. The method of claim 1, wherein the array of selectively couplable capacitors comprises:

a binary array of capacitors having capacitances with different values;

a unary array of capacitors having capacitances of a same value; or a capacitive ladder network having two elementary capacitance values.

6. The method of claim 1, wherein determining whether changes to the capacitance result in an increase or decrease of the electric power comprises:

applying an increment of a same sign to a control signal for the array of selectively couplable capacitors at each iteration in response to a resulting variation of the digital signal corresponds to an increase of average current through the antenna; and reversing the sign of the increment in response to the resulting variation corresponding to a decrease of the average current.

7. The method of claim 1, wherein the successive iterations are performed multiple times during a same process of data exchange between the contactless device and a terminal.

8. An electronic system for optimizing power reception in a contactless device, 8. the system comprising:

a receiver antenna configured to capture an amplitude-modulated electromagnetic field;

a variable capacitance circuit coupled to the receiver antenna;

a power detection circuit configured to measure a signal indicative of instantaneous electric power received by the receiver antenna; and a control circuit configured to:

iteratively adjust the variable capacitance circuit through multiple capacitance values, monitor changes in the signal indicative of instantaneous electric power received by the receiver antenna in response to each adjustment, and set the variable capacitance circuit to a capacitance value that maximizes the amplitude of the instantaneous electric power received by the receiver antenna, wherein the control circuit is further configured to execute the iterative adjustment process a plurality of times during a same process of data exchange between the contactless device and a terminal.

9. The electronic system of claim 8, further comprising a rectifying circuit coupled to the receiver antenna, the rectifying circuit comprising a diode bridge having inputs coupled to terminals of the receiver antenna and a first output delivering a rectified signal as a rectified voltage.

10. The electronic system of claim 9, further comprising:

a filtering capacitor coupled between the first output of the diode bridge and a ground reference; and an impedance control circuit configured to control an impedance seen by the receiver antenna.

11. The electronic system of claim 8, wherein the power detection circuit comprises:

a sensor configured to deliver an analog signal representative of a variation of intensity of a sense current; and an analog-to-digital converter configured to convert the analog signal into a digital signal for monitoring by the control circuit.

12. The electronic system of claim 8, wherein the variable capacitance circuit comprises a digital-to-analog converter with an array of capacitors, the array comprising:

a binary array of capacitors having capacitances with different values;

a unary array of capacitors having capacitances of a same value; or a capacitive ladder network having two elementary capacitance values.

13. The electronic system of claim 8, wherein the control circuit is configured to:

apply an increment of a same sign to a control signal for the variable capacitance circuit at each iteration in response to a resulting change in the signal indicative of instantaneous electric power corresponds to an increase of average current through the receiver antenna; and reverse the sign of the increment in response to the resulting change corresponding to a decrease of the average current.

14. The electronic system of claim 8, wherein the control circuit comprises a processing circuit configured to deliver binary control signals to the variable capacitance circuit based on measurements from the power detection circuit.

15. A method for optimizing power reception in a contactless device, the method comprising:

measuring a digital signal representative of electric power received by an antenna from an amplitude-modulated electromagnetic field;

determining, by a controller, through successive iterations, whether changes to a capacitance of an array of selectively couplable capacitors coupled to the antenna result in an increase or decrease of the electric power received by the antenna by monitoring the digital signal;

selectively coupling or decoupling, by the controller, capacitors in the array of selectively couplable capacitors to set a total capacitance that maximizes the electric power received by the antenna; and maintaining, by the controller, the total capacitance at the value that maximizes the electric power received after the successive iterations are complete.

16. The method of claim 15, wherein measuring the digital signal comprises:

rectifying the amplitude-modulated electromagnetic field using a diode bridge to produce a rectified signal; and converting an analog signal derived from the rectified signal into the digital signal using an analog-to-digital converter.

17. The method of claim 15, wherein the array of selectively couplable capacitors comprises:

a binary array of capacitors having capacitances with different values;

a unary array of capacitors having capacitances of a same value; or a capacitive ladder network having two elementary capacitance values.

18. The method of claim 15, wherein determining whether changes to the capacitance result in an increase or decrease of the electric power comprises:

applying a capacitance increment of a same polarity at each iteration in response to a corresponding change in the digital signal indicating an increase in the electric power received; and reversing the polarity of the capacitance increment in response to the corresponding change indicating a decrease in the electric power received.

19. The method of claim 15, wherein the successive iterations are terminated in response to:

a decrease in average electric power being detected after an increase in average electric power is detected, indicating that the electric power has transited through a maximum; or a predetermined number of iterations being completed during which an increase in average electric power is consistently detected.

20. The method of claim 15, wherein the successive iterations are performed multiple times during a data exchange process between the contactless device and a terminal.

* * * * *